April 21, 1942.　　　　M. GREEN　　　　2,280,400
APPARATUS FOR DETECTING AND/OR PREVENTING ICE FORMATIONS
Filed March 10, 1939　　　3 Sheets-Sheet 1
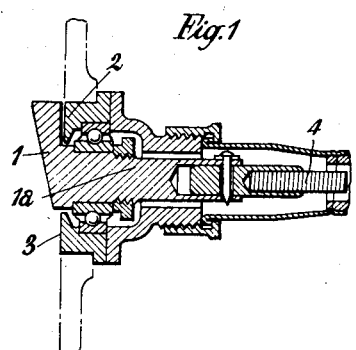
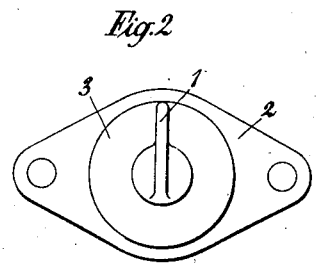
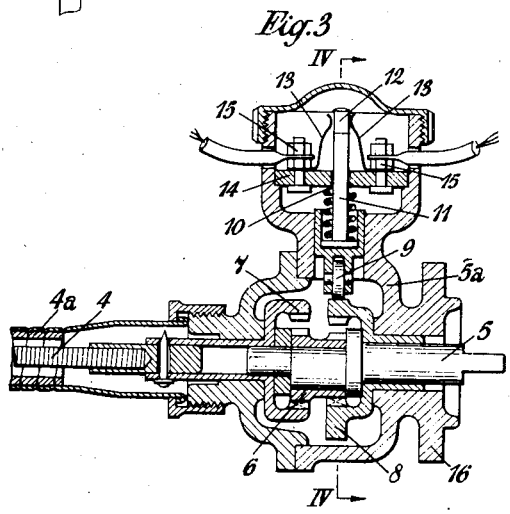
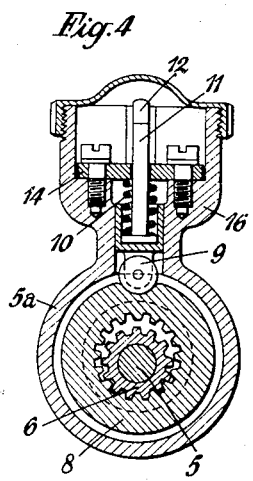
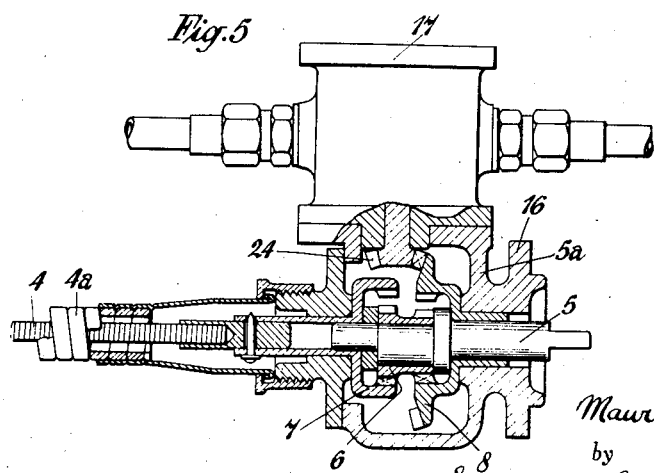
Inventor:
Maurice Green,
by
Smith, Michael & Gardiner
Attorneys.

April 21, 1942.                M. GREEN                2,280,400
APPARATUS FOR DETECTING AND/OR PREVENTING ICE FORMATIONS
            Filed March 10, 1939        3 Sheets-Sheet 2
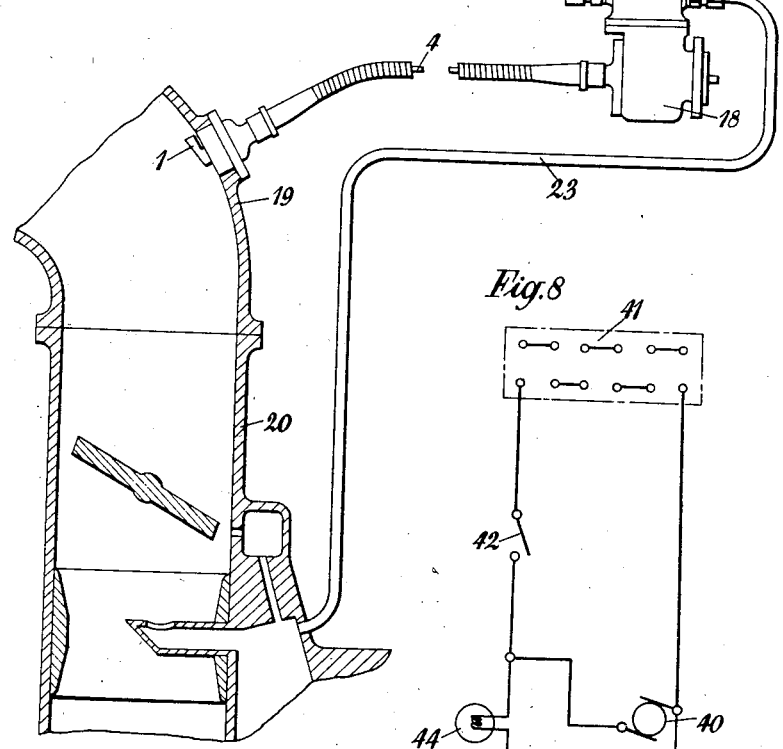
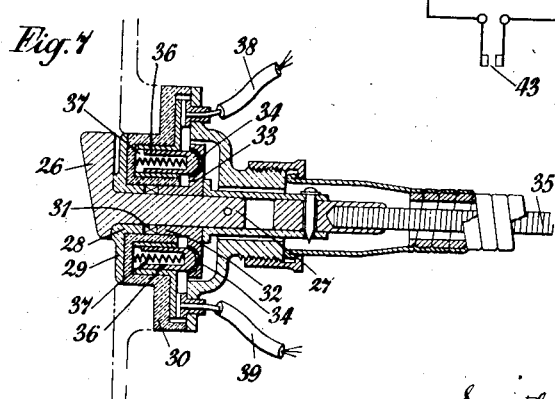
Inventor.
Maurice Green,
by
Smith, Michael & Gardiner
Attorneys April 21, 1942.                M. GREEN                2,280,400
APPARATUS FOR DETECTING AND/OR PREVENTING ICE FORMATIONS
            Filed March 10, 1939        3 Sheets-Sheet 3
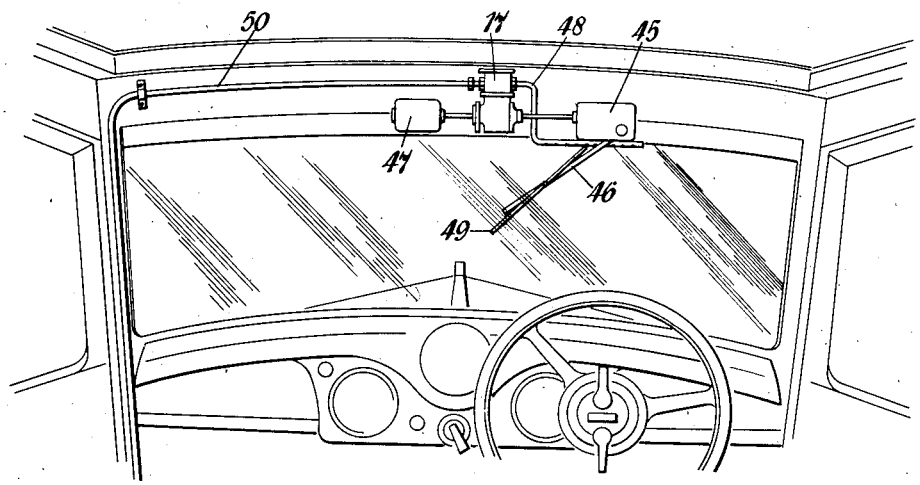
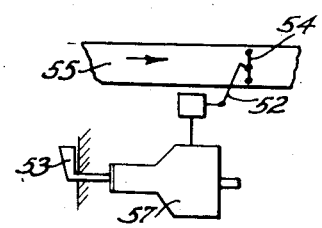
INVENTOR:—
Maurice Green,
By:-Smith, Michael & Gardiner, Attorneys.

Patented Apr. 21, 1942

2,280,400

UNITED STATES PATENT OFFICE 2,280,400

APPARATUS FOR DETECTING AND/OR PREVENTING ICE FORMATION

Maurice Green, Patchway, near Bristol, England

Application March 10, 1939, Serial No. 261,087
In Great Britain March 11, 1938

18 Claims. (Cl. 244—134)

This invention relates to apparatus for detecting and for preventing ice formation on surfaces or parts such, for example, as the exposed structural parts and aerofoils of aircraft, the induction systems, the air intakes and the carburettors of internal combustion engines, the windscreens of aircraft, road and rail vehicles and boats and other surfaces, whether stationary or moving, on which it is desirable to detect and/or remove any ice formation.

The main object of the invention is to provide improved apparatus which will readily detect and/or remove ice, which is relatively simple to construct, install and operate, is robust and which is cheap to manufacture.

The improved apparatus according to the invention comprises a detecting member, hereinafter referred to as the detector, movable adjacent to a part or surface on which ice may form and indicating and/or de-icing apparatus so associated with the detector as to be operative when the movement of the detector adjacent to the part or surface is impeded by ice formation on such part or surface. Preferably a movable member normally maintained stationary by friction or other suitable means is so associated with the detector, or a drive for the detector, that such member moves to initiate operation of the indicating and/or de-icing apparatus when the movement of the detector is impeded by ice formation.

In one convenient arrangement the drive for the detector includes a differential gear having a driving member rotated by any convenient means, one driven member for moving the detector and a second driven member for operating the indicating and/or de-icing apparatus, movement of the second driven member being normally prevented by a force, for example by friction, which is greater than the force required to move the detector when the adjacent surface or part is free from ice but less than the force required to move the detector when impeded by ice formation on such surface or part. Thus normally when the driving member is rotated, the detector is moved by the first driven member of the differential gear and the second driven member remains stationary whilst when ice forms, the detector is substantially prevented from moving and the second driven member is moved to cause actuation of the indicating and/or de-icing apparatus.

In an alternative arrangement the part or surface adjacent to the detector and on which ice tends to form, is itself movable to cause operation of the indicating and/or de-icing apparatus, movement of such part or surface being normally prevented by a force, for example by friction, which is, however, insufficient to prevent movement of such surface or part when ice formed thereon is engaged by the moving detector. In this arrangement the detector is driven continuously so that it passes over the surface or part which remains stationary as long as there is no ice thereon. As soon as sufficient ice to engage the adjacent detector forms on the surface, the detector moves the surface against its normal holding force and the indicating and/or de-icing apparatus is actuated.

In either arrangement the member or part which is normally stationary and is moved when movement of the detector is impeded by ice, may operate electric contacts controlling directly or through a relay or the equivalent, an indicating device, such as a warning lamp, and/or de-icing apparatus, such as an actuator for a shutter controlling a supply of hot air or gas or an electric heating element. Alternatively, or in addition, such member or part may operate a pump or valve controlling the supply of anti-freezing solution to appropriate positions.

The detector may comprise a rotating vane having an edge thereof in close proximity to but not in contact with a surface forming a part of, or attached to the element on which ice is likely to form, the clearance distance between the edge of the vane and the adjacent surface preferably being adjustable to vary the sensitivity of the apparatus, that is the amount of ice formation which causes operation thereof.

When the apparatus according to the invention is used to prevent icing of a windscreen, the detector may comprise the blade of a windscreen wiper whilst the co-operating surface consists of the windscreen itself. With this arrangement the driving mechanism of the windscreen wiper may be arranged to operate the driving member of the differential gear whilst the first and second driven members of the gear are respectively coupled to the wiper blade and to a pump or valve for supplying anti-freezing solution to the windscreen preferably through a channel in the wiper blade.

When an arrangement in accordance with the invention is employed in conjunction with an internal combustion engine in order to prevent the formation of ice in the induction pipe, means may be provided for increasing the temperature of the inlet air or supplying anti-freezing fluid to the induction pipe, such means being operated manually when warning is given of ice formation or automatically following detection of the ice. Similarly when ice is detected in the carburettor of an internal combustion engine, a pump or other device may be operated manually or automatically to cause anti-freezing liquid, such as alcohol, to be supplied to the carburettor. Alternatively hot lubricating oil or hot exhaust gases may be supplied to a jacket surrounding the induction pipe or the carburettor or an electric heating element embedded in such a jacket may be energised. If desired, however, the use of de-icing apparatus may, in the case of aircraft, be avoided if on warning of ice formation, the aircraft is directed to a region where ice forming conditions do not exist.

The improved apparatus according to the invention can be readily installed on the exposed surfaces or structures of aircraft including those surfaces, such as leading wing edges and control surfaces, which are directly opposed to the air stream and thus most prone to ice formation. The apparatus provides an immediate indication of ice formation so that de-icing equipment can be set in operation by the pilot without delay or the operation thereof can be initiated automatically following detection of the ice.

Usually the apparatus will be allowed to operate continuously when there is any danger of ice formation and it will be appreciated that when following detection, the ice is removed, the detector will automatically resume its normal operation so that it is ready for detecting further ice formation and does not require resetting by the pilot after it has operated.

The invention can be carried into practice in various ways and two convenient arrangements in accordance therewith will now be described, by way of example, with reference to the accompanying drawings, in which:

Figures 1 and 3 are sectional side elevations of the two main parts of the first arrangement, Figure 2 is an end elevation of the part shown in Figure 1.

Figure 4 is a section on the line IV—IV of Figure 3,

Figure 5 is a side elevation, partly in section, of a modified form of the part shown in Figure 3, Figure 6 is a diagram showing one application of the arrangement shown in Figures 1, 2 and 5, Figure 7 is a sectional side elevation of the second arrangement, Figure 8 is a wiring diagram, and Figure 9 is a diagram showing another application of the arrangement shown in Figure 5.

Figure 10 is a diagrammatic showing of the device adapted to a hot fluid supply.

The arrangement shown in Figures 1 to 4 comprises two main parts, namely a unit which is shown in Figures 1 and 2 for detecting ice formation and an operating unit, which is shown in Figures 3 and 4, which is responsive to the detection of ice by the detecting unit.

As shown in Figures 1 and 2, the detecting unit comprises a rotatable vane 1 which constitutes the detector and has a shaft 1a supported by ball bearings in a housing 2 so that when the vane rotates, its rear edge moves over a surface 3 at the front of the housing. The housing 2 is mounted in an area where the detection of ice formation is desired and in such a position that the ice will form on the surface 3. As will be appreciated the vane 1 is free to rotate as long as there is no ice on the surface 3 but when ice accumulates on this surface it impedes the rotation of the vane and may completely stop it. The sensitivity of the detector, that is the amount of ice required to impede movement of the vane depends on the clearance between the rear edge of the vane and the surface 3. This clearance may be adjusted to suit operating conditions in any convenient manner, for example by inserting packing washers between the front end of the inner ball race of the bearing and the collar on the shaft 1a towards which such race is pressed by the usual clamping nut. The vane 1 is rotated by a flexible cable 4 which is connected to the shaft 1a and is enclosed in a flexible protective covering 4a.

The operating unit comprises a spindle 5 rotatable in a housing 5a and driven continuously, for example, by an electric motor, or by an internal combustion engine associated with the aircraft or vehicle on which the arrangement is mounted, if necessary through suitable gearing.

The inner end of the spindle 5 is eccentric and carries a double pinion 6 having two sets of teeth of which one set engage the internal teeth of a pinion 7 rigidly coupled to the end of the flexible cable 4 for driving the vane 1. The other set of teeth on the pinion 6 engage the internal teeth of a pinion 8 which is free to rotate on the spindle 5 but, as shown most clearly in Figure 4, is normally prevented from rotating by a roller 9 which is pressed into a recess in the periphery of the pinion 8 by a compression spring 10 surrounding a plunger 11. The plunger 11 is of metal and has at its upper end a sleeve 12 of insulating material which, when the plunger is in the position shown in Figures 3 and 4, engages two spring contacts 13 carried by a plate 14 of insulating material and respectively connected to two terminals 15. The two contacts 13 are thus normally insulated from one another and the circuit between the terminals 15 open.

In order that motion can be transmitted from the spindle 5 through the pinion 6 to either the pinion 7 or the pinion 8, the pinions 7 and 8 have different numbers of teeth. Thus, when the spindle 5 rotates the arrangement acts as a differential gear and as long as the pinion 8 is prevented from moving by the roller 9, the spindle 5 drives the flexible cable 4 which in turn rotates the vane 1 since the resistance to motion of the vane under normal conditions is less than the resistance to motion of the pinion 8.

When, however, ice forms on the surface 3 and tends to impede free movement of the vane 1, the resistance to motion thereof increases until it exceeds the restraining force exerted by the roller 9 on the pinion 8. The pinion 8 then starts to rotate thereby forcing the plunger 11 upwardly so that the circuit is completed through the contacts 13. The circuit completed at the contacts 13 may control an electric indicating device, such as a warning lamp or an alarm bell and/or may bring into operation de-icing apparatus for removing ice formed on the surface with which the vane 1 is associated.

While the vane 1 is prevented by ice from rotating, the pinion 8 will continue to revolve and the roller 9 will drop into the recess in the periphery of the pinion 8 once during each revolution so as intermittently to break the circuit between the contacts 13. The intermittent closing and opening of the circuit will, in the case for example, of an indicating lamp, cause flashing of this lamp and thus assist in drawing attention thereto. As soon as the surface 3 is free from ice, the force required to raise the roller 9 will be greater than that required to rotate the vane so that the vane will again revolve and the pinion 8 remain stationary with the contacts 13 open.

Whilst in the arrangement shown in Figures 1 to 4 the detecting unit and the operating unit are constructed as separate parts connected by a flexible cable, it will be appreciated that if desired the detecting and operating units may be mounted in a single housing, the shaft 1a of the vane being directly connected to the pinion 7. Such a construction can be used when there is space available for mounting the complete apparatus adjacent to the surface on which ice formation is to be detected. When the spindle 5 is driven by an electric motor a flange 16 on the housing 5a is preferably directly connected to the motor casing.

In the modified arrangement shown in Figure 5, the operating unit is arranged to drive a pump for supplying anti-freezing solution when the vane 1 is prevented from rotating due to ice formation. In this modified arrangement the pinion 8 has bevel teeth on its periphery which engage a co-operating bevel gear wheel 24 on the lower end of a driving shaft for a pump 17 directly mounted on the housing 5a. Normally the friction of the bevel gear and the force required to drive the pump are greater than the force required to rotate the vane 1 so that, as in the arrangement shown in Figures 1 to 4, the pinion remains stationary and the vane 1 rotates. When ice forms on the surface 3 the pinion 8 rotates and drives the pump 17 which supplies anti-freezing solution to an appropriate part of the apparatus in the neighbourhood of the surface 3. The pump is provided with a valve or is otherwise so constructed as to prevent leakage of the anti-freezing solution when the pump is stationary. When anti-freezing solution at an adequate pressure is available the pinion may be arranged to control a valve instead of a pump.

Figure 6 shows, somewhat diagrammatically, the application of an arrangement such as is shown in Figures 1, 2 and 5 to the induction system of an internal combustion engine. In this arrangement the vane 1 with its associated housing 2 and surface 3 is mounted at a bend in the induction pipe between the carburettor 20 and the engine (not shown) whilst the flexible driving cable 4 for the vane 1 is connected to an operating unit 18 similar to that shown in Figure 5. When ice forms inside the induction pipe in the neighbourhood of the rotating vane 1, the pump 17 is operated to supply anti-freezing solution from a reservoir tank 21 through pipes 22 and 23 to the carburettor 20. The spindle 5 of the arrangement shown in Figure 6 may be driven by an electric motor or in any convenient manner from the associated internal combustion engine.

As will be appreciated the unit shown in Figure 5 may be arranged to operate any suitable de-icing equipment other than a pump for supplying anti-freezing solution in which case the bevel pinion 24 rotated by the pinion 8 may be mechanically connected to the appropriate apparatus.

The arrangement shown in Figure 7 differs from that described above mainly in that the movable vane is driven positively instead of through a differential gearing and the associated surface on which ice may form is capable of moving with the vane when the ice formation on such surface sufficiently impedes the free movement of the vane. In this arrangement a vane 26 has a shaft 27 mounted to rotate in a sleeve 28 having at its front end a disc 29 over which the vane rotates and which constitutes the surface, corresponding to the surface 3 of the arrangement shown in Figure 1, on which ice forms. The sleeve 28 with its disc 29 is capable of rotating in a main housing 30 of insulating material and has at its rear end dogs 31 which engage with corresponding dogs at the front end of a second sleeve 32 surrounding the shaft 27 and carrying at its rear end a commutator disc 33 provided with a pair of diametrically opposite recesses 34 lined with insulating material. The shaft 27 of the vane 26 may be connected to a flexible driving cable 35 as shown in Figure 7 or may be positively driven in any other convenient manner so that when the apparatus is in operation the vane 26 rotates continuously.

Normally the commutator disc 33 is prevented from moving by spring pressed plungers 36 disposed in sockets 37 in the housing 30 and having their outer ends engaging in the recesses 34 in the disc.

When ice forms on the surface 29 and tends to impede rotation of the vane 26, the torque on the surface 29 and communicated, through the dogs 31 to the commutator disc 33, exceeds the braking force exerted by the plungers 36 so that the disc 29 and the commutator disc 33 rotate. The plungers 36 thus leave the recesses 34 and engage the conducting part of the disc 33 so as to complete a circuit between terminal wires 38 and 39 which are respectively electrically connected to the two plungers 36. Instead of forming the housing 30 of insulating material the plungers 36 may be insulated from one another by means of insulating sleeves arranged in the sockets 37. The circuit completed when the commutator disc 33 rotates may control an indicating or alarm device or may initiate the operation of the de-icing equipment. Alternatively, the commutator disc may be replaced by a pinion or other driving means for a pump for anti-freezing solution or for some other form of mechanically operated de-icing apparatus.

The wiring diagram of Figure 8 shows a driving motor 40 for rotating the spindle 5 of arrangements such as are shown in Figures 1 to 6 or for directly rotating the vane in an arrangement such as Figure 7, this motor being energised from a battery 41 under the control of a switch 42. The contacts 43 shown in the diagram correspond to contacts such as the contacts 13 on the arrangement shown in Figures 1 to 4 or the commutator disc arrangement shown in Figure 7 and act when closed due to ice formation, to complete a circuit for an indicating lamp 44.

In Figure 9, which shows the wind-screen of a motor vehicle as viewed from the driving seat, an arrangement in accordance with the invention is employed for detecting and preventing ice formation on the wind-screen, such arrangement actuating the wind-screen wiper. Thus a unit similar to that shown in Figure 5 has its flexible shaft connected to the drive 45 of a wind-screen wiper 46 mounted in the usual way on the wind-screen as is clearly shown in Figure 9. The motor 47 normally employed for driving the wind-screen wiper is then connected to the driving shaft 5 (Figure 5) of the differential mechanism so that the wind-screen wiper 46 is driven through such mechanism in the same way as the moving vane of the arrangements shown in the other figures.

The outlet pipe 48 of the pump 17 is then bent so as to extend across the wind-screen above the arc struck out by the wiper blade 49 and this pipe is provided with perforations at the lower part of its surface so that when movement of the wiper blade is impeded by ice formation on the wind-screen and the pump starts to operate, a supply of anti-freezing solution is delivered by the pump 17 to the pipe 48, such solution running down the wind-screen and melting the ice thereon. If desired, the pipe 48 can be connected to a channel in the blades of the wind-screen wiper. The inlet pipe 50 of the pump is connected to a reservoir of anti-freeizng solution, which may be similar to the tank 21 shown in Figure 6 and may be mounted in any convenient position, for example, below the dash-board.

It will be appreciated that in any of the arrangements described above any convenient means may be employed for giving an indication of ice formation and/or for causing operation of de-icing apparatus associated with the part or surface on which ice has formed. Thus, for example, instead of supplying anti-freezing solution to the appropriate part of the apparatus, the operating unit controlled by the detecting unit may cause either directly or through an electric relay or other control mechanism, the operation of heating apparatus for supplying hot air or exhaust gases to the part in question. Thus, for example, referring to Figure 10, the operating unit 51 may control shutter mechanism 52 in such a manner that when the movement of the detecting vane 53 is impeded by ice formation a shutter 54 is caused to open to supply hot air 55 to the neighbourhood of the part on which the ice tends to form. Alternatively, an electric heating element may be embedded in or arranged in the neighbourhood of such part and the supply of energy to such element may be controlled either directly or through a relay by the closing of contacts such as the contacts 13 of the arrangement shown in Figures 1 to 4 or of the commutator device shown in Figure 7.

It will also be appreciated that the above description is by way of example only and that modifications may be made in the structural details of both the detecting and operating units to suit operating conditions and the nature and shape of the part or surface which is to be protected from ice formation. Furthermore, if desired, two or more detector units associated with the same or different parts on which ice may form, may be actuated by a single operating unit.

For the sake of convenience, the term "detecting" will be employed in the following statement of claim, to include either giving an indication, for example a visual or audible indication, of the formation of ice or the prevention of such formation with the use accordingly of a de-icing equipment under the control of the detecting apparatus.

What I claim as my invention and desire to secure by Letters Patent of the United States is:

1. Apparatus for detecting ice formation, comprising the combination of a part having a surface on which ice may form, a detector member movable adjacent to the said surface of such part, means for moving the detector member, an indicating device, and means associated with the detector member and operative to actuate the indicating device when the movement of the detector member is impeded by ice formation on the surface of said part.

2. Apparatus for detecting and preventing ice formation, comprising the combination of a part on which ice may form, a detector member movable adjacent to the surface of such part, means for moving the detector member, de-icing apparatus, and means associated with the detector member and operative to initiate the operation of the de-icing apparatus when the movement of the detector member is impeded by ice formation on the surface of the said part.

3. Apparatus for detecting ice formation, comprising the combination of a part having a surface on which ice may form, a detector member movable adjacent to the said surface of such part, means for moving the detector member, a movable member associated with the detector member, braking means for normally maintaining the said movable member stationary, and means whereby the moving means for the detector member causes movement of the said movable member when the force required to move the detector member is increased due to ice formation on the said surface to a value greater than the braking force exerted on the movable member by the said braking means.

4. Apparatus for detecting ice formation, comprising the combination of a part having a surface on which ice may form, a detector member movable adjacent to the said surface of such part, a differential gear having a driving and two driven members, means for rotating the driving member of the differential gear, means for connecting the detector member to one driven member of the differential gear, means for holding the second driven member of the differential gear normally stationary, an electric contact device, and means whereby the contact device is actuated when the said second driven member moves, the braking force exerted on the second driven member by the holding means being greater than the force required to move the detector member when the said surface is free from ice but less than the force required to move the detector member when it is impeded by ice formation on the said surface.

5. Apparatus for detecting ice formation, comprising the combination of a part having a surface on which ice may form, a detector member movable adjacent to the said surface of such part, a differential gear having a driving and two driven members, means for rotating the driving member of the differential gear, means for connecting the detector member to one driven member of the differential gear, a pump for supplying anti-freezing solution to cause de-icing of the said part and means for driving the pump by the second driven member of the differential gear, the friction and resistance to movement of the pump being greater than the resistance to movement of the detector member when the said surface is free from ice so that normally the detector member moves and the pump is stationary whilst when movement of the detector member is impeded by ice formation on the said surface, the detector member remains substantially stationary and the second driven member moves to operate the pump.

6. Apparatus for detecting ice formation, comprising the combination of a part having a surface on which ice tends to form, a rotatable vane having an edge movable in close proximity to but not in contact with the said surface, a driving spindle, means for rotating the said spindle, a pinion having two independent sets of teeth eccentrically mounted on the spindle so as to rotate therewith, two internal pinions with different numbers of teeth and respectively engaging the two sets of teeth on the pinion carried by the spindle, means for connecting one internal pinion to the rotating vane so that the vane is driven thereby, an indicating device, means whereby the indicating device is actuated by movement of the second internal pinion, and braking means for holding the second internal pinion stationary, the braking force exerted on the second internal pinion being greater than the force required to move the vane when the said surface is free from ice but less than the force required to move the vane when it is impeded by ice formation on the said surface.

7. Apparatus for detecting ice formation, comprising the combination of a part having a surface on which ice tends to form, a rotatable vane having an edge movable in close proximity to but not in contact with the said surface, a driving spindle, means for rotating the said spindle, a pinion having two independent sets of teeth eccentrically mounted on the spindle so as to rotate therewith, two internal pinions with different numbers of teeth and respectively engaging the two sets of teeth on the pinion carried by the spindle, means for connecting one internal pinion to the rotating vane so that the vane is driven thereby, de-icing apparatus, means whereby the operation of the de-icing apparatus is initiated by movement of the second internal pinion, and braking means for holding the second internal pinion stationary, the braking force exerted on the second internal pinion being greater than the force required to move the vane when the said surface is free from ice but less than the force required to move the vane when it is impeded by ice formation on the said surface.

8. Apparatus for detecting ice formation, comprising the combination of a part having a surface on which ice tends to form, a rotatable vane having an edge movable in close proximity to but not in contact with the said surface, a driving spindle, means for rotating the said spindle, a pinion having two independent sets of teeth eccentrically mounted on the spindle so as to rotate therewith, two internal pinions with different numbers of teeth and respectively engaging the two sets of teeth on the pinion carried by the spindle, means for connecting one internal pinion to the rotating vane so that the vane is driven thereby, an electric contact device, a spring-pressed plunger normally engaging in a recess in the periphery of the second internal pinion, and means whereby movement of the plunger as it leaves the said recess during rotation of the second internal pinion actuates the electric contact device, the braking force exerted on the second internal pinion by the plunger being greater than the force required to move the vane when the said surface is free from ice but less than the force required to move the vane when it is impeded by ice formation on the said surface.

9. Apparatus for detecting ice formation, comprising the combination of a movable part having a surface on which ice may form, a detector member movable adjacent to the said surface, means for moving the detector member, an indicating device, means whereby movement of the said movable part causes operation of the indicating device and braking means for normally preventing movement of the said movable part, the braking force being insufficient to prevent movement of the said movable part when ice formed on the surface thereof in engaged by the moving detector member.

10. Apparatus for detecting ice formation, comprising the combination of a movable part having a surface on which ice may form, a detector member movable adjacent to the said surface, means for moving the detector member, de-icing apparatus, means whereby movement of the said movable part initiates the operation of the de-icing apparatus and braking means for normally preventing movement of the said movable part, the braking force being insufficient to prevent movement of the said movable part when ice formed on the surface thereof is engaged by the moving detector member.

11. Apparatus for detecting ice formation, comprising the combination of a rotatable part having a surface on which ice may form, a supporting housing in which said part is rotatably mounted, a rotating vane movable in close proximity to but not in contact with the said surface, a supporting shaft for the vane passing through a bore in said part, such bore being coaxial with the axis of rotation of the said part, means for rotating the shaft, a commutator disc rotatably mounted on the said shaft and operatively connected to the said movable part so as to rotate therewith, spring-pressed plunger contacts normally engaging in insulated recesses in the said commutator disc and an electric circuit which is completed when the said plunger contacts directly engage the surface of the commutator disc following rotation thereof from its normal position, the braking action of the plunger contacts on the commutator disc and thus on the rotatable part being sufficient to prevent rotation thereof when there is no ice but insufficient to prevent rotation thereof with the vane when the vane engages ice formed on the surface of the said part.

12. Apparatus for detecting ice formation on a windscreen comprising the combination with the windscreen, of a windscreen wiper blade movable over at least a part of the outside surface of the windscreen, driving means for the wiper blade, a movable member associated with the said driving means, braking means for the said movable member, and de-icing means for the windscreen actuated by movement of the said movable member, the arrangement being such that the movable member is operated by the said driving means when movement of the wiper blade on the windscreen is impeded by ice formation.

13. Apparatus for detecting ice formation on a windscreen comprising the combination with the windscreen, of a windscreen wiper blade movable over at least a part of the outside surface of the windscreen, a differential gear having a driving and two driven members, means for rotating the driving member of the differential gear, means for connecting the wiper blade to one driven member of the differential gear, braking means for holding the second driven member of the differential gear normally stationary, a supply of anti-freezing solution, and a device actuated by the second driven member of the differential gear for controlling the flow of anti-freezing solution from the supply to a delivery channel in the wiper blade, the braking force exerted on the second driven member being greater than the force required to move the wiper blade when the windscreen is free from ice but less than the force required to move the said blade when such movement is impeded by ice formed on the windscreen.

14. Apparatus for detecting ice formation, comprising the combination of a part having a surface on which ice may form, a detector member movable adjacent to the said surface of such part, means for adjusting the clearance between the detector member and the said surface, means for moving the detector member, an indicating device, and means associated with the detector member and operative to actuate the indicating device when the movement of the detector member is impeded by ice formation on the surface of said part.

15. Apparatus for detecting ice formation, comprising the combination of a part having a surface on which ice may form, a rotatable vane having an edge movable in close proximity to but not in contact with the said surface, a rotatable shaft supporting the said vane and passing through a bore in the said part, means for moving the shaft longitudinally to adjust the clearance between the edge of the vane and the said surface, means for rotating the shaft, an indicating device, and means associated with the vane shaft and operative to actuate the indicator device when the movement of the vane is impeded by ice formation on the surface of the said part.

16. Apparatus for detecting ice formation, comprising the combination of a part having a surface on which ice may form, a rotatable vane having an edge movable in close proximity to but not in contact with the said surface, a rotatable shaft supporting the said vane and passing through a bore in the said part, means for moving the shaft longitudinally to adjust the clearance between the edge of the vane and the said surface, means for rotating the shaft, de-icing apparatus, and means associated with the vane shaft and operative to initiate the operation of the de-icing apparatus when the movement of the vane is impeded by ice formation on the surface of the said part.

17. Apparatus for detecting ice formation, comprising the combination of a part on which ice may form, a detector member movable adjacent to the surface of such part, means for moving the detector member, a supply of hot fluid, a connection for supplying such fluid to the part on which ice may form, a control device for the supply of hot fluid and means associated with the detector member for causing actuation of the said control device when the movement of the detector member is impeded by ice formation.

18. Apparatus for detecting ice formation, comprising a part having a surface on which ice may form, a detector member adjacent to the said surface, which detector member and surface are relatively movable in close proximity to one another, means for effecting the relative movement of the detector member and surface, detecting means and means automatically operative to bring the detecting means into operation upon impedance occurring of said relative movement due to ice formation on the surface.

MAURICE GREEN.